United States Patent [19]
Buchman

[11] 4,103,260
[45] Jul. 25, 1978

[54] SPATIAL POLARIZATION CODING ELECTRO-OPTICAL TRANSMITTER

[75] Inventor: William W. Buchman, Los Angeles, Calif.

[73] Assignee: Hughes Aircraft Company, Culver City, Calif.

[21] Appl. No.: 756,292

[22] Filed: Jan. 3, 1977

[51] Int. Cl.² .............................................. G02F 1/26
[52] U.S. Cl. .................................. 332/7.51; 350/157; 250/199
[58] Field of Search ............... 332/7.51; 350/150, 151, 350/157, 160; 250/199

[56] References Cited
U.S. PATENT DOCUMENTS

| | | | |
|---|---|---|---|
| 3,398,918 | 8/1968 | Girault | 244/3.13 |
| 3,401,590 | 9/1968 | Massey | 350/157 |
| 3,447,855 | 6/1969 | Skinner | 350/157 |
| 3,572,895 | 3/1971 | Schmidt et al. | 350/157 |
| 3,684,350 | 8/1972 | Wentz | 350/157 |
| 3,719,414 | 3/1973 | Wentz | 350/157 |

OTHER PUBLICATIONS

Hunt, "A Variable Wedge Birefringent Compensator," 5/70, pp. 220–221, Applied Optics, vol. 9 #5, G-250.

*Primary Examiner*—Nelson Moskowitz
*Attorney, Agent, or Firm*—Lawrence V. Link, Jr.; W. H. MacAllister

[57] ABSTRACT

A transmitter for producing an energy beam which has encoded thereon as a polarization state of the energy, angular position along a selected one of a plurality of dimensions across the beam. The transmitter comprises a laser unit for transmitting energy through a plurality of switchable modulators with each of said modulators comprising an electro-optical device, such as a 180° retarder or a 90° rotator, coupled between a pair of birefringent wedges. The wedges are configured such that when the associated electro-optical device is not energized the birefringence of the wedges cancel. When energized, the electro-optical device translates the polarization state of the energy passing therethrough such that the birefringence of the wedges add so as to cause a variation in the polarization across the beam. The spatial orientation of the two wedges in a given modulator determines the dimension across the beam encoded thereby.

18 Claims, 9 Drawing Figures

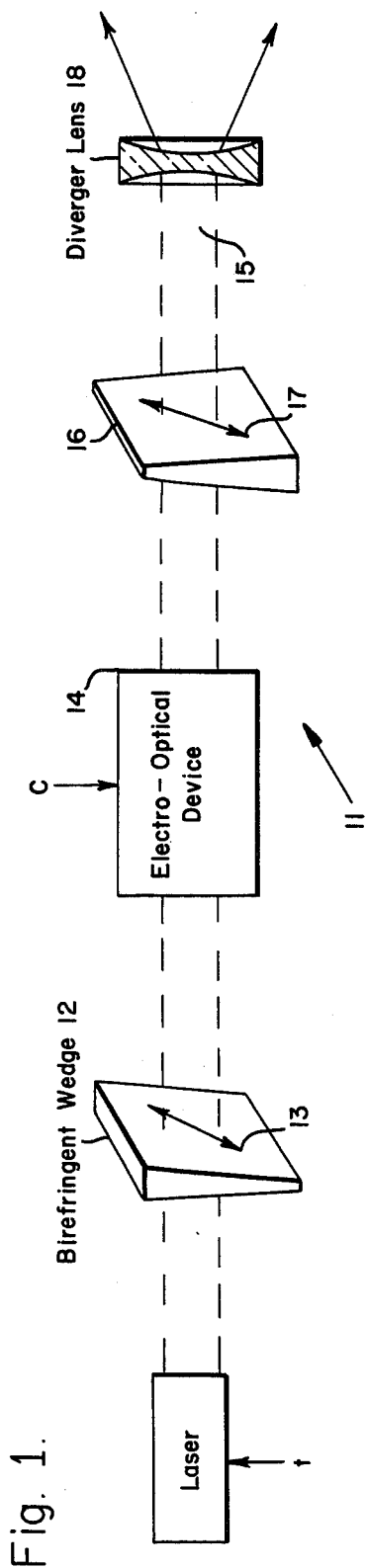
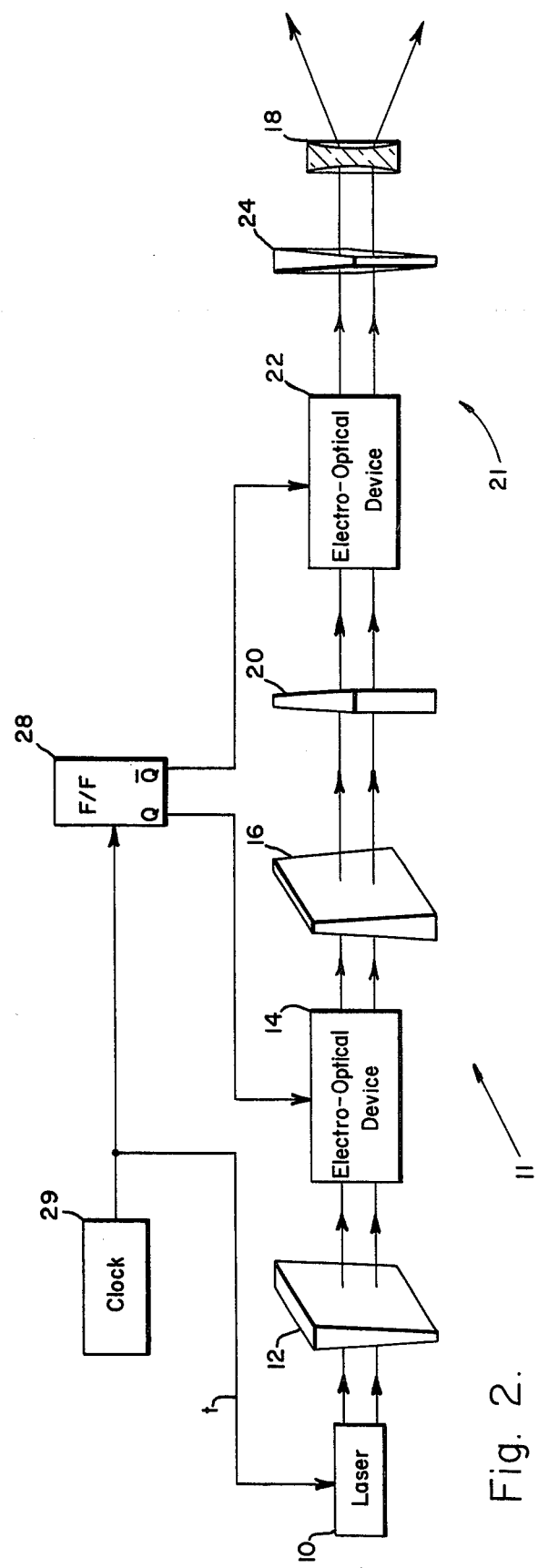
Fig. 1.
Fig. 2.

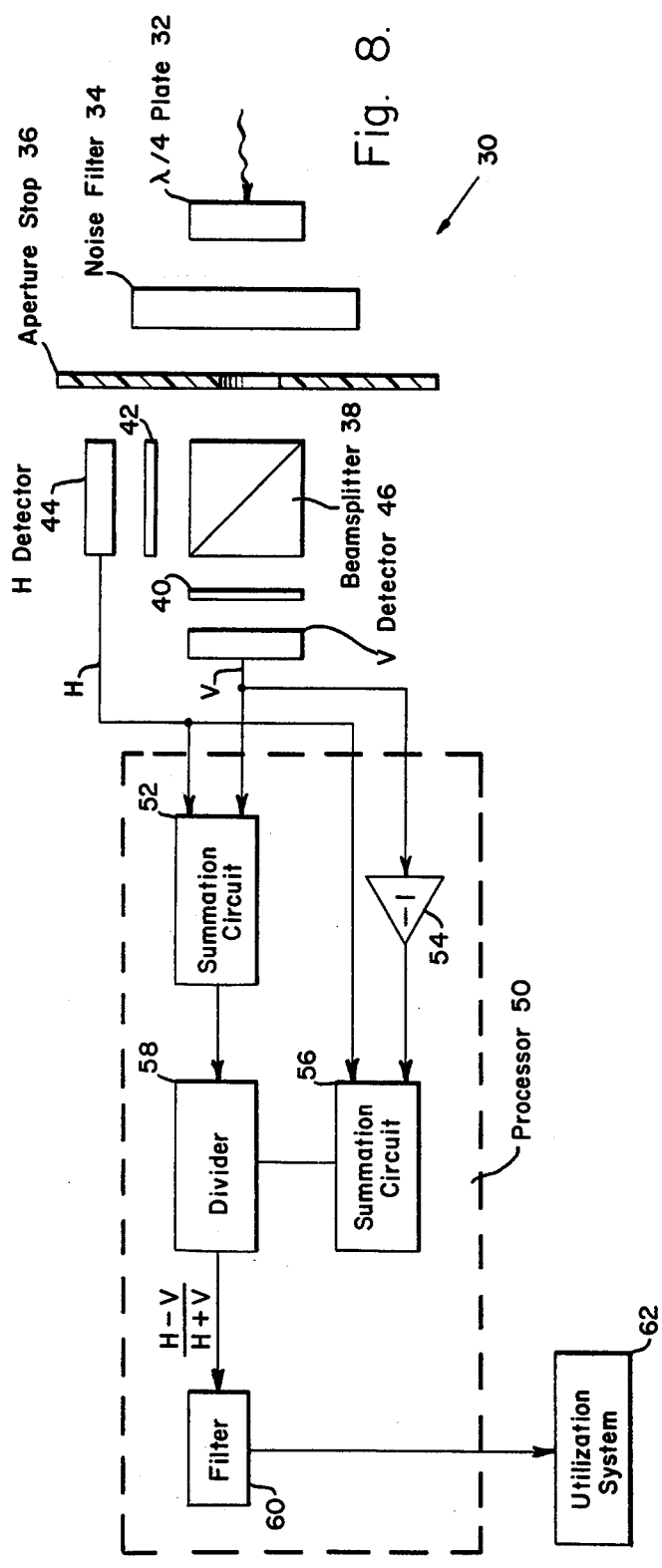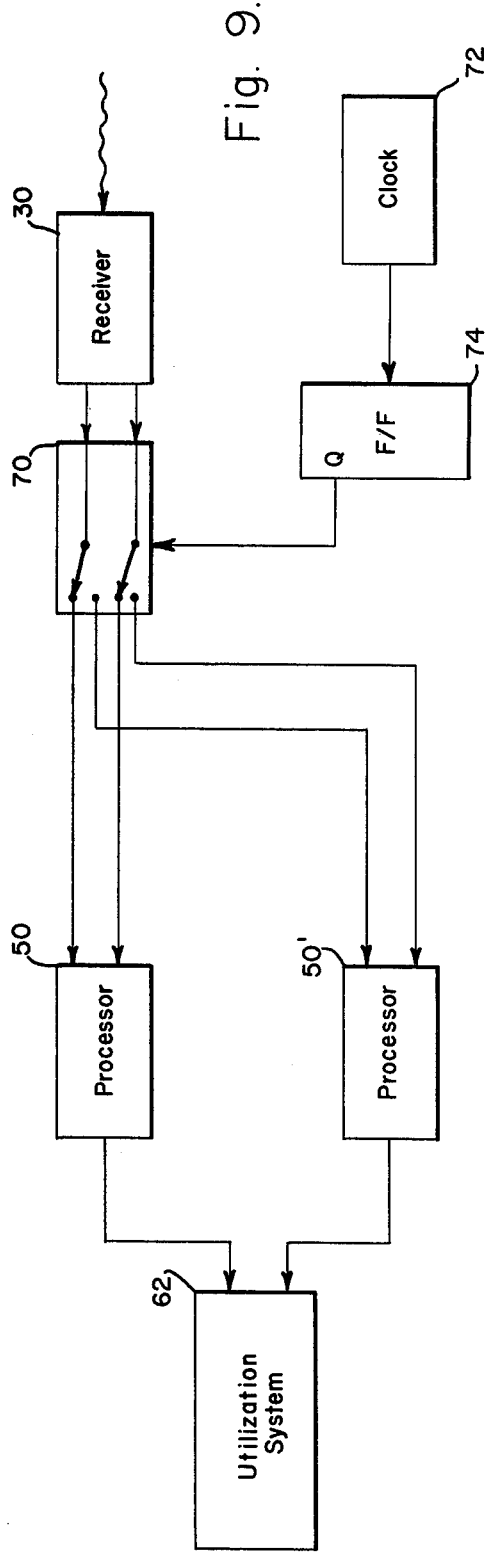

SPATIAL POLARIZATION CODING ELECTRO-OPTICAL TRANSMITTER

BACKGROUND OF THE INVENTION

This invention relates generally to transmitters and/or modulation for encoding angular position as a polarization state of the energy along a selectable one of a plurality of dimensions across the beam. More particularly, it relates to such devices which allow for the rapid change of the encoded dimension, for example, between the pitch and yaw dimensions, by electro-optical control means.

My U.S. Pat. No. 4,030,686; entitled "POSITION DETERMINING SYSTEMS"; and assigned to a common assignee; includes a transmitter for transmitting energy encoded such that the polarization states of the energy vary across the beam; and a receiver which responds to the polarization of the received energy to provide signals indicative of the relative position of an object within the beam.

According to one of the preferred embodiments disclosed in my just referenced U.S. Pat., the transmitter includes means for encoding the beam such that the polarization varies from elliptical polarization of a first rotational sense at one edge of the beam to linear polarization at the beam's center through elliptical polarization of the opposite sense at the opposite edge of the beam. The term "elliptical polarization" includes circular polarization as a special case thereof.

In my said prior patent polarization encoding across the beam was implemented by means of a laser unit that applies linearly polarized light to a wedge of birefringent material such as crystalline quartz. The polarization of the incident laser energy is oriented at 45° to the optical axis of the wedge whereby the wedge decomposes the input light into two components one of which is along and the other perpendicular to the optical axis of the wedge. In passing through the wedge one of the light components is phase shifted with respect to the other and the configuration of the wedge is such that the phase shift is ±90° at the edges of the beam. With this arrangement right-handed circular polarization is encoded at one beam edge and left-handed circular polarization at the other. The light transmitted through the center of the wedge has substantially no relatively phase shift except for an integral number of half wavelengths, between the orthogonal components thereof, and its polarization state is substantially the same or orthogonal to that of the input light to the wedge. The output light from the wedge is passed through a diverger lens which expands and shapes the beam, e.g. to produce a conical beam.

In accordance with the systems disclosed in my above cited U.S. patent, position information along a second dimension across the beam is obtained by rotating the wedge in its optical plane and transmitting a second pulse, or by using parallel transmission channels each of which is associated with a respective dimension across the beam.

SUMMARY OF THE INVENTION

A primary object of the subject invention is to provide a new and improved transmitter and/or modulator for tansmitting energy which has encoded thereon as a polarization state of the energy, angular position along a selected one of a plurality of dimensions across the beam.

A more specific object of the invention is to provide a single channel transmitter which allows electro-optical switching of the spatial distribution of polarization encoded energy between a selected number of dimensions across the beam.

In accordance with one embodiment of the subject invention, the transmitter comprises a laser unit arranged to transmit energy through a plurality of switchable modulators, each of which comprise an electro-optical device, such as a 180°0 retarder of a 90° rotator coupled between a pair of birefringent wedges. The wedges are configured so that when the associated electro-optical device is not energized the birefringence of the wedges cancel. When energized the electro-optical device translates the polarization state of energy passing therethrough such that the birefringence of the wedges add and cause a variation in the polarization state across the beam. The spatial orientation of the wedges in a given modulator determines the dimension across the beam which is encoded when the associated electro-optical device is energized.

Each of said switchable modulators comprise two birefringent wedges which may be of crystalline quartz configured so as to cancel the effects of one another under quiescent or non-energized conditions of the electro-optical device. In accordance with one preferred embodiment the first wedge and the input polarization of the light are arranged so that the retardation of the light passing through the wedge varies from $-\frac{1}{8}$ wavelength at one edge of the beam, to zero retardation in the center of the beam, to $\frac{1}{8}$ wavelength at the other edge of the beam. The second wedge of a given modulator is oriented with its optical axis parallel to that of the first wedge and is configured to cancel the effect of the birefringence of the first wedge, i.e. the algebraic sum of the birefringence of the two wedges is zero to energy passing therethrough without polarization rotation between the wedges. As shown in FIGS. 1 and 2 this cancellation of birefringence may be obtained by means of identically shaped wedges having a 180° rotation in their relative orientation, i.e. the thin part one wedge is aligned with the thick part of the other and vice versa.

The electro-optical devices are such that the horizontal (H) components of the input light signal travels through the two wedges entirely as an H component if the electro-optical device is not energized; the same is true of the vertical (V) component. When the electro-optical device is energized the birefringence of the two wedges add due to a polarization shift induced within the electro-optical device. For example, the H is converted into a V and the V into an H in passing through the energized unit. The interchange of the horizontal and vertical component orientations may be accomplished, for example, by using an electro-optical device that becomes a 90° rotator when energized or one that becomes a retarder oriented at zero or at + 181° 1 to the polarization of the energy applied to the first wedge.

BRIEF DESCRIPTION OF THE DRAWINGS

The novel features of this invention, as well as the invention itself, will be better understood from the accompanying description taken in connection with the accompanying drawings in which like reference characters refer to like parts and in which:

FIG. 1 is a block and schematic diagram of a transmitter in accordance with the subject invention which, in response to a control signal applied thereto, transmits energy which has angular position encoded thereon as a polarization state of the energy, and which in absence of the control signal transmits non-coded energy;

FIG. 2 is a block and schematic diagram of a transmitter in accordance with th subject invention for transmitting energy, which has angular position encoded thereon as a polarization state of the energy, along a selected one of a plurality of dimensions across the beam;

FIG. 8 is a block diagram of a receiver processor arrangement which was disclosed in my hereinabove cited patent application and which may be used to decode the energy of the system of FIG. 1 to provide a signal indicative of the position of an object along one dimension of the tranmitted beam; and FIG. 9 is a block diagram of a dual channel receiver processor unit disclosed in my hereinabove cited patent application and which is suitable for decoding the energy produced by the transmitter shown in FIG. 2 to provide signals indicative of angular position of an object along two non-parallel dimensions across a transmitted beam and which includes means for measuring the angular position along each of the dimensions on alternate transmitted cycles.

DETAILED DESCRIPTION OF THE PREFERRED EMBODIMENTS

Figure 7:
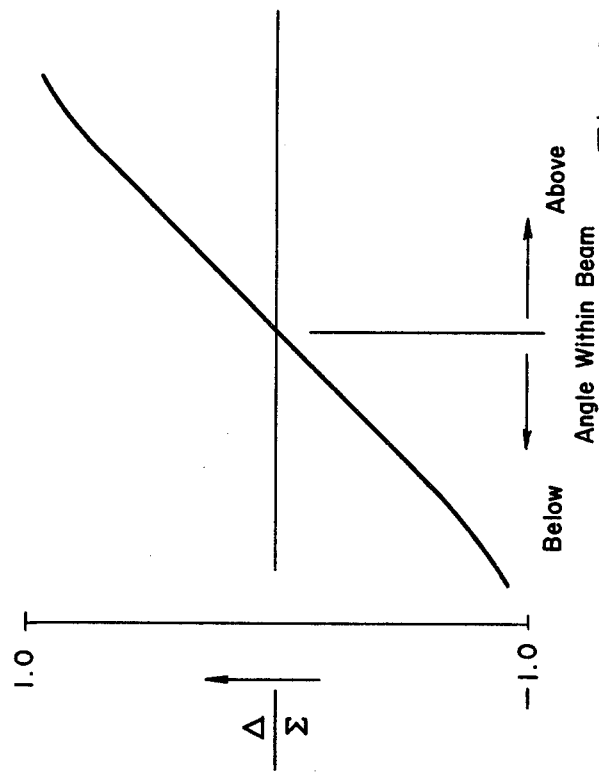
FIG. 7 is a graph of the output signal from a receiver which decodes the energy transmitted by the transmitter of FIG. 1 so as to provide an output signal indicative of the position of an object within the transmitted beam.

Referring first to FIG. 1, laser 10 is arranged to transmit electro-magnetic energy through a modulator 11 comprising a birefringent wedge 12, an electro-optical device 14, and birefringent wedge 16. The output light from wedge 16 passes through diverger lens 18 which spreads the beam to obtain the desired beam width. The wedges may be constructed from crystalline quartz and configurfed so that with no polarization translation introduced by electro-optical device 14, the birefringence of the two wedges cancel. For example, the thin portion of wedge 12 is in alignment with the thick portion of wedge 16 and vice versa, and the wedges are so configured that a full wavelength (or multiples thereof) of retardation is encountered by energy anywhere within the output beam from wedge 16. For example, wedge 12 and the polarization of the input beam are so arranged that the retardation varies from a $-\frac{1}{8}$ of a wavelength at one edge of the beam, to zero net retardation in the center of the beam, to $+\frac{1}{8}$ wavelength at the other edge of the beam. Polarization of the input beam should be at 45° to the fast and slow axis of the wedge and the optical axis 13 of the birefringent material forming the wedge should be substantially perpendicular to the incident beam. Wedge 16 is oriented with its optical axis 17 parallel to optical axis 13 of wedge 12 and the relative thicknesses of wedges 12 and 16 are such that when electrical-optical device 14 is not energized there is a cancellation effect of the birefringence of the wedges and consequently the light from laser transmitter 10 passes through elements 12, 14, 16 and 18 without substantial modification of its polarization.

Figure 3:
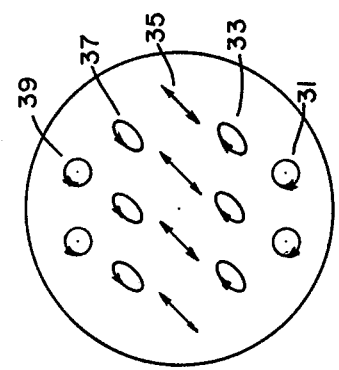
FIG. 3 depicts the polarization pattern across the output beam of the transmitter of FIG. 2 when electro-optical device 14 is energized.

When electro-optical device 14 is energized, it causes the H and V components of the electro-magnetic energy passing therethough to be converted into V and H components, respectively, and thereby causes the birefringence of wedges 12 and 16 to add, e.g. the birefringence at the top of the beam shown at 15 in FIG. 1 is a +90°, it's zero at the center of said beam and at the bottom of the beam it is a −90°. As explained in my hereinabove cited application such a distribution of birefringence will cause applied linearly polarized light to have the radiated pattern shown in FIG. 3. As shown in FIG. 3, the polarization state across the beam varies from right-handed circular polarization at plane 31 at one edge of the beam, through right-handed elliptical polarization in plane 33, linear polarization at plane 35, left-handed elliptical polarization at plane 37, and left-handed circular polarization at opposite edge of the beam at plane 39.

Electro-optical device 14 may be, for example, a 90° rotator when energized or else it may become a retarder oriented at 0° or at +180° to the input polarization at wedge 14 which introduces a half-wave phase shift. It is noted that the typical electro-optical 90° rotator also includes a half-wave retarder as part of its construction.

Figure 5:
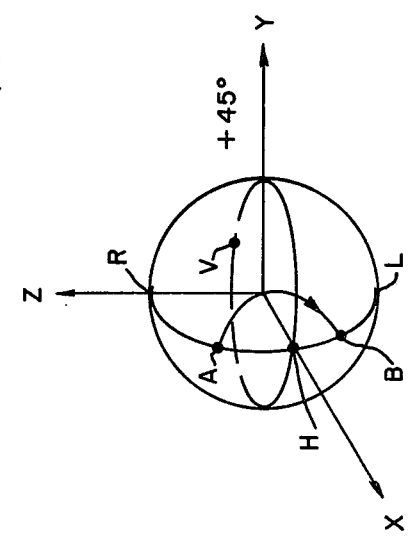
FIG. 5 is a Poincare sphere shown for the purpose of explaining the operation of the electro-optical devices of FIGS. 1 and 2 when implemented by means of a 180° retarder device.

Reference is momentarily directed to FIG. 5 which shows a Poincare sphere which is useful for explaining changes in polarization state when electro-optical device 14 is implemented by means of a 180° retarder. In the illustration of FIG. 5 any polarization state is represented as a point on the sphere and the effect of any retarder is to rotate all points on the sphere to new locations thereon. The axis of said rotation is determined by the diameter through the points unaffected by the retardation and the amount of said rotation is equal to the amount of retardation. The direction of retardation is clockwise when the sphere is viewed from the outside and the point being advanced is closest to the observer.

FIG. 5 illustrates the situation where electro-optical device 14 is a retarder such as a half-way lithium niobate $LiNbO_3$, transverse Pockels cell and wedge 12 is adjusted so that its optical axis 13 is at 45° with respect to the vibration of the input light. Either a second birefringent plate (not shown) crossed with the wedge is used or else the wedge is made to be a whole number of birefringent waves thick in the center. Fine adjustment is achievable by moving the wedge up or down. The wedge angle is very small, i.e. just enough to give a $-\frac{1}{8}$ wave change in retardation at the upper edge of the beam. The Pockels cell (electro-optical device 14) is oriented so that its fast axis is along the horizontal direction when it is energized.

Still referring primarily to FIGS. 1 and 5, first consider what happens when electro-optical device 14 is not energized. On center, H polarization enters and leaves wedge 12 and the same is true of wedge 14. Off center, the wedge is thicker so that light entering H is rotated on the sphere (FIG. 5) by $\frac{1}{8}$ of a revolution clockwise about the 45° axis of the sphere. This is indicated in FIG. 5 by a motion of H to A. Upon the energy reaching wedge 16, the wedge is thinner at the top and the retardation is of the same amount but of the opposite sense as for wedge 12. This is represented by a counter clockwise rotation about the 45° axis of ⅛ of a revolution and thus returns point A to H. Similar explanations may be used for intermediate points to show that the H light entering anywhere inside the aperture will leave as H light.

With the Pockels cell energize to give a half wave (i.e. 180°) retardation, the situation just described changes. On axis, the H polarization still remains H polarization going through wedge 12, and the 180° rotation ot the sphere (FIG. 5) about H caused by the Pockels cell (device 14) leaves H unchanged. Wedge 16 leaves the H component light unchanged on axis and the light leaves the transmitter in the H state. At the edge of the beam wedge 12 gives a retardation of 45° which transforms the H point to A and the half-wave plate (Pockels cell) rotates A clockwise about H half a revolution to B. Upon reaching wedge 16 the rotation is equal and opposite to that which brought H to A by wedge 12. This counter clockwise rotation of ⅛th revolution above the 45° axis brings the polarization state to L which represents left-handed circular polarization. For intermediate points in the beam, intermediate states of polarization will result.

Figure 6:
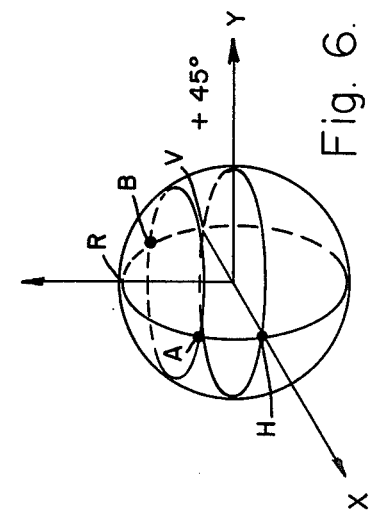
FIG. 6 is a Poincare sphere shown for the purpose of explaining the operation of the electro-optical devices of FIGS. 1 and 2 when implemented by means of a 90° rotator device.

Similar results are obtainable using a 90° rotator and FIG. 6 shows the Poincare sphere representation for that case. For an unenergized rotator the explanation that H input polarization remains in the H state upon passing through the system is the same as for the retarder described above. When device 14 is a 90° rotator and is energized, on axis, H passes through wedge 12 unchanged; the 90° rotator rotates H by 180° on the sphere (see FIG. 6) about the R-L axis to V, and wedge 16 leaves V unchanged. At the edge of the beam the first wedge brings H to A by ⅛ revolution clockwise about the 45° axis. The rotator rotates A about a small circle to B and the counterclockwise rotation about the 45° axis from the wedge 16 brings B to R. Intermediate points are transformed to intermediate states.

A Faraday cell could be used for the 90° electro-optical rotator or it could be implemented by means of two quarter wave plates and a half-wave electro-optical retarder. The quarter wave plates may be combined with respective wedges so that no extra parts are required.

In the embodiment of FIG. 1, wedges 12 and 16 are shown in one configuration in which refraction is canceled, i.e. the truncated apexes of the wedges are on opposite sides of the optical axis. However, this is not a necessary restriction inasmuch as the truncated apexes of the wedges could be on the same side of the optical axis if the optical axes of the wedges were crossed.

Further it is noted that each of the wedges shown in the figures could be a "compound wedge" fabricated from two identical wedge shaped components each of which contribute one-half the birefringence change across the aperture. The truncated apexes of the two segments are on opposite sides of the optical center line of the modulator and the optical axes of the component wedges are crossed so that the birefringence of one wedge component cancels that of the other except for the desired birefringence change across the compound wedge aperture. This construction compensates for temperature variations in the same way as does crossed wave plate 14 of my hereinabove cited U.S. patent, with the additional advantage of reducing the variety of required parts.

There are many configurations of retarders, rotators, cells, etc. that could be used with similar results to those hereinabove; for example, merely interchanging the fast and slow axes of the retarder described with respect to FIG. 5 or the sign of rotation of the devices described with respect to FIG. 6. If desired the wedges in a given modulator could be configured so that their birefringence adds (the beam is encoded) when the electro-optical device is not energized. In such a configuration the birefringence of the wedges would cancel (beam not encoded) when the electro-optical device is energized.

Referring now primarily to FIG. 2, wedges 12 and 16 and electro-optical device 14 comprise modulator 11 and wedges 20 and 24 together with electro-optical device 22 comprise modulator 21. These two modulators are "crossed" in the sense that the direction of the wedges in modulator 11 is up and down while in modulator 21 it is from side to side.

Figure 4:
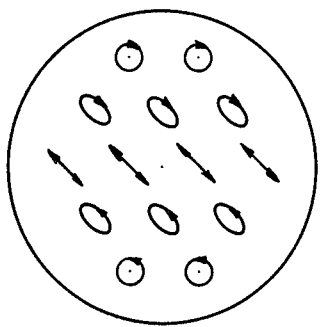
FIG. 4 depicts the polarization pattern across the output beam of the transmitter of FIG. 2 when electro-optical device 22 is energized.

When electro-optical device 14 is energized the polarization pattern shown in FIG. 3 is encoded onto the energy passing through modulator 11. With electro-optical device 22 not energized said polarization pattern is not changed within modulator 21 and so the polarization pattern of FIG. 3 is transmitted through diverger lens 18. Similarly when electro-optical device 22 is energized and device 14 is not, no polarization encoding is performed within modulator 11 and the pattern of FIG. 4 is encoded on to the transmitted beam by modulator 21.

The output signals from clock 29 triggers laser unit 10 as well as a "toggle" flip-flop (F/F) 28 whereby electro-optical device 14 is energized on alternate transmission pulses and electro-optical device 22 is energized during the remaining transmission pulses.

FIGS. 8 and 9 show a single channel and a double channel, respectively, receiver processor combination which is adapted for decoding the transmitted energy so as to produce output signals (see FIG. 7) indicative of the angular position of the source of the received energy within the beam. The arrangements of FIGS. 8 and 9 are described in detail in my above cited copending application and some of that description is incorporated herein as an illustration of one embodiment of a system which is adapted for utilizing the encoded information provided by transmitters in accordance with the subject invention.

Referring first primarily to FIG. 8, receiver 30, reverses the above described encoding with the exception that the birefringent plate is not wedged but rather is implemented by means of a quarter wave plate 32. The output energy from quarter wave plate 32 is applied through a relatively narrow bandwidth background noise filter 34, through the aperture of stop 36 to polarization sensitive beam splitter 38. Beam splitter 38 applies horizontally polarized energy to a horizontal detector 44 and vertically polarized energy to a vertical detector 46. The output signals from detectors 44 and 46 are applied in parallel to a processor 50.

In the operation of receiver 30, the quarter wave plate introduces a 90° phase shift between linearly polarized components along the fast and slow axes as they pass through.

For example, a purely circularly polarized wave is converted into a linearly polarized wave with its polarization oriented at ±45° with respect to the quarter wave plates optic axis. The sign of the orientation angle depends on the "handedness" of the circularly polarized energy applied to quarter wave plate 32. Polarization sensitive beam splitter 38 is oriented with the projection of the normal to its beam splitting surface on quarter wave plate 32 at 45° to the optic axis of the quarter wave plate and functions to separate the two orthogonal polarization components. Ideally, the beam splitter applies only horizontally and vertically polarized energy to detectors 44 and 46, respectively; however, polarization filters 40 and 42 are included to insure the polarization separation and are oriented so as to pass only horizontally and vertically polarized energy, respectively, to detectors 44 and 46. Polarization filters 42 and 44 may be of any suitable type such as the "Polaroid" type HR sheet which is suitable for the near infrared spectral region. In applications where the degree of polarization separation provided by filters 40 and 42 is adequate, beam splitter 38 need not be of the polarization sensitive type.

Narrow bandwidth filter 34 is used to minimize the effect of background radiation noise. Detectors 44 and 46 could be, for example, 10mm diameter Schottky barrier diode detectors of the type manufactured by United Detector Technology. The apertures stop 36, which may have a 5mm diameter aperture, for example, limits the amount of energy collected by the detectors. The purpose of this "limiting aperture" is to minimize the effect of atmospheric scintillation on the position measurement signals, by insuring each detector collects energy from the target over the identical optical path.

Still referring primarily to FIG. 8, processor 50 implements the term $(H-V)/(H+V)$ (sometimes referred to as $\Delta/\Sigma$) wherein the signal designated H is the output from detector 44 and the signal designated V is the output from detector 46. A plot of this function ($\Delta/\Sigma$) is presented in FIG. 7 and as is evident therefrom it is a substantially linear function, at least for relatively small angles from boresight.

In processor 50, circuit 52 forms the term $H+V$ and circuits 54 and 56 form the term $H-V$. The output signal from summation circuit 56 is divided within divider 58 by the output signal from circuit 52 and the resultant quotient signal is applied through a filter 60, for smoothing and noise rejection, to utilization system 62. It may be desirable that adjustable gains be provided to compensate for channel imbalance.

It is noted that processor 50 could be a portion of the utilization system which would then respond directly to the H and V signals from receiver 30. In a missile beam riding application, for example, the system 62 may further include a thresholding circuit followed by a self-gating sample and hold circuit so that the pulse signal from filter 60 is sampled and maintained between pulse periods.

Referring now primarily to FIG. 9, the received energy is processed through receiver 30 in a manner that is identical to that described hereinabove relative to FIG. 8 and the output signals H and V are processed through a switching unit 70. Unit 70 is shown as a mechanical double throw, double pole switching arrangment in the interest of clarity of the illustration; however, it will be understood that in practice an electronic switching arrangement, such as one comprising FETs would be implemented. A reference clock 72 drives a flip-flop circuit 74 the output of which controls switching unit 70 such that the signals from receiver 30 are applied to processors 50 and 50' on alternate pulses from clock 72.

Clock 72 in the receiver is synchronized with the clock 29 in the transmitter. For example in the missile guidance application the clocks are synchronized just prior to missile launch. Hence, during the periods that the polarization pattern of FIG. 3 is encoded on the transmitted beam the output signals from receiver 30 are coupled through to elevation processor 50; and during periods that the polarization pattern illustrated in FIG. 4 is encoded on the transmitted beam the output from receiver 30 is coupled through to azimuth processor 50'. The information applied to processors 50 and 50' is processed in the same manner as described hereinabove relative to FIG. 8 and is then applied to utilization system 62, wherein it is used to control the effective elevation and azimuth control surfaces, respectively, of the vehicle. It is noted that if desired, processor 50 could be time shared, with switch 70 at the output thereof. In this configuration processor 50' would not be required.

Thus having described a new and useful transmitter for polarization encoding a selected one of a plurality of dimensions across a transmitted beam, what is claimed is:

1. A transmitter for producing an energy beam which has encoded thereon as a polarization state of the energy, position along a selected one of a plurality of dimensions across the beam, said transmitter comprising:
   a laser unit which provides a beam of linearly polarized energy;
   a plurality of switchable modulators arranged relative to said laser unit and to one another so that the laser energy passes sequentially through each of said modulators; and
   with said modulators each comprising an electro-optical device coupled between a pair of birefringent wedges, with said electro-optical device including means for switching between a selected one of two states, with the polarization of the energy passing through said electro-optical device being transformed by a first amount when said electro-optical device is in its first state and transformed by a second amount when it is in its second state, and with said wedges having their fast and slow axes oriented at approximately 45 degress to the polarization of the energy provided by said laser unit and having their optical axes substantially perpendicular to the energy beam, and with said wedges being configured and oriented so that energy everywhere within the beam, in passing through said pair of wedges, passes through substantially the same amount of birefringent material and so that when said electro-optical device is in said first state the birefringence of said wedges combines so as to cause no substantial polarization encoding across the beam of energy at the output of said modulator and when said electro-optical device is in said second state the birefringence of said wedges combines so that the energy at the output of said modulator is polarization encoded along a preselected dimension across the beam.

2. The transmitter of claim 1 wherein said wedges are so configured that when said electro-optical device is in its first state their birefringence substantially cancels and when said device is in its second state their birefringence substantially adds.

3. The transmitter of claim 1 wherein the spatial orientation of the wedges is different in each of said modulators, whereby a different dimension across the beam is encoded by each respective modulator when said respective modulator is switched into its second state.

4. The transmitter of claim 1 wherein said electro-optical device passes energy with substantially zero polarization transformation when it is in its first state and when it is in its second state it changes the polarization of one component of the energy from horizontal to vertical and the polarization of the other component from vertical to horizontal.

5. The transmitter of claim 1 wherein said electro-optical device passes energy with substantially zero polarization transformation when it is in its first state and it functions as a 90° rotator when it is in its second state.

6. The transmitter of claim 1 wherein said electro-optical device passes energy with substantially zero polarization transformation when it is in its first state and it functions as a 180° linear retarder when in its second state.

7. The transmitter of claim 1 wherein said electro-optical device is a half-wave lithium niobate transverse Pockels cell.

8. The transmitter of claim 1 wherein said electro-optical device is a Faraday cell.

9. A transmitter for producing a polarization encoded energy beam comprising:
a laser unit which provides a beam of linearly polarized energy;
at least two switchable modulators arranged relative to said laser unit and to one another so that the laser energy passes sequentially through each of said modulators; and
with said modulators each comprising an electro-optical device coupled between a pair of birefringent wedges with said electro-optical device including means for switching between a first state in which substantially zero polarization transformation is impressed on energy passing therethrough and a second state in which an interchange of the horizontal and vertical components of the energy is effected, said wedges having their fast and slow axes oriented at approximately 45 degrees to the polarization of the energy provided by said laser unit and having their optical axes substantially perpendicular to the energy beam, and said wedges being configured and oriented so that energy everywhere within the beam, in passing through said pair of wedges, passes through substantially the same amount of birefringent material and so that when said electro-optical device is in one of its states the birefringence of said wedges combines so as to cause no substantial polarization encoding across the beam of energy at the output of said modulator and when said electro-optical device is in said other state the birefringence of said wedges combines so that the energy at the output of said modulator is polarization encoded and wherein the spatial orientation of said wedges is different in each of said modulators; and
means for controlling said modulators so that only one modulator at a time is selectively switched to said other state in which the beam passing through said modulator is polarization encoded.

10. The transmitter of claim 9 wherein said electro-optical device is a half-wave lithium niobate transverse Pockels cell.

11. The transmitter of claim 9 wherein said electro-optical device is a Faraday cell.

12. A modulator for selectively applying polarization encoding to a laser beam of linearly polarized energy, said modulator comprising:
first and second birefringent wedges;
an electro-optical device coupled between said wedges and including means for switching between a first state in which the polarization of the energy passing through said electro-optical device is transformed by a first amount and a second state in which the energy passing therethrough is transformed by a second amount; and
with said wedges having their fast and slow axes oriented at approximately 45° to the polarization of the applied laser energy and having their optical axis substantially perpendicular to the energy beam, and said wedges being configured and oriented so that energy everywhere within the beam, in passing through said pair of wedges, passes through substantially the same amount of birefringent material and so that when said electro-optical device is in said first state the birefringence of said wedges combines so as to cause no substantial polarization encoding of energy at the output of said modulator and when said electro-optical device is in its second state the birefringence of said wedges combines so that the energy at the output of the modulator is polarization encoded.

13. The modulator of claim 12 wherein said wedges are so configured that when said electro-optical device is in its first state their birefringence substantially cancels and when said device is in its second state their birefringence substantially adds.

14. The modulator of claim 12 wherein said electro-optical device passes energy with substantially zero polarization transformation when it is in its first state and when it is in its second state it changes the polarization of one component of the energy from horizontal to vertical and the polarization of the other component from vertical to horizontal.

15. The modulator of claim 12 wherein said electro-optical devices passes energy with substantially zero polarization transformation when it is in its first state and it functions as a 90° rotator when it is in its second state.

16. The modulator of claim 12 wherein said electro-optical device passes energy with substantially zero polarization transformation when its is in its first state and it functions as a 180° retarder when it is in its second state.

17. The modulator of claim 12 wherein said electro-optical device is a half-wave lithium niobate transverse Pockels cell.

18. The modulator of claim 12 wherein said electro-optical device is a Faraday cell.

* * * * *